(12) United States Patent
Ijima

(10) Patent No.: US 10,829,090 B2
(45) Date of Patent: Nov. 10, 2020

(54) WIPER CONTROL DEVICE

(71) Applicant: DENSO CORPORATION, Kariya (JP)

(72) Inventor: Hiroto Ijima, Hamamatsu (JP)

(73) Assignee: DENSO CORPORATION, Kariya (JP)

( * ) Notice: Subject to any disclaimer, the term of this patent is extended or adjusted under 35 U.S.C. 154(b) by 127 days.

(21) Appl. No.: 15/998,581

(22) PCT Filed: Feb. 14, 2017

(86) PCT No.: PCT/JP2017/005374
§ 371 (c)(1),
(2) Date: Aug. 16, 2018

(87) PCT Pub. No.: WO2017/141920
PCT Pub. Date: Aug. 24, 2017

(65) Prior Publication Data
US 2019/0263359 A1   Aug. 29, 2019

(30) Foreign Application Priority Data

Feb. 18, 2016 (JP) ................................. 2016-029152

(51) Int. Cl.
*B60S 1/08* (2006.01)
(52) U.S. Cl.
CPC ....................... *B60S 1/08* (2013.01)
(58) Field of Classification Search
CPC ....................................................... B60S 1/08

USPC .......................................................... 701/49
See application file for complete search history.

(56) References Cited

U.S. PATENT DOCUMENTS

| | | | | |
|---|---|---|---|---|
| 2009/0119865 | A1* | 5/2009 | Amagasa | B60S 1/0814 15/250.31 |
| 2013/0251352 | A1* | 9/2013 | Natsume | H02P 1/22 388/854 |
| 2014/0013535 | A1* | 1/2014 | Natsume | B60S 1/0818 15/250.12 |
| 2017/0361810 | A1* | 12/2017 | Ijima | B60S 1/0807 |

FOREIGN PATENT DOCUMENTS

| | | |
|---|---|---|
| JP | 2011-512285 A | 4/2011 |
| JP | 4691165 B2 | 6/2011 |
| JP | 5535738 B2 | 7/2014 |
| JP | 2015-013529 A | 1/2015 |
| JP | 5683700 B2 | 3/2015 |

* cited by examiner

*Primary Examiner* — Maceeh Anwari
(74) *Attorney, Agent, or Firm* — Oliff PLC

(57) ABSTRACT

A wiper control circuit stops the supply of power for rotating a wiper motor in a case in which a wiper blade is stopped before a storage position. In a case in which the amount of change in a rotational angle of an output shaft before and after stopping the supply of power for rotating the wiper motor, which is detected by a rotational angle sensor, has reached a predetermined range, the wiper control circuit performs self-locking to prevent the rotation of the output shaft in a state after the supply of power is stopped.

5 Claims, 7 Drawing Sheets

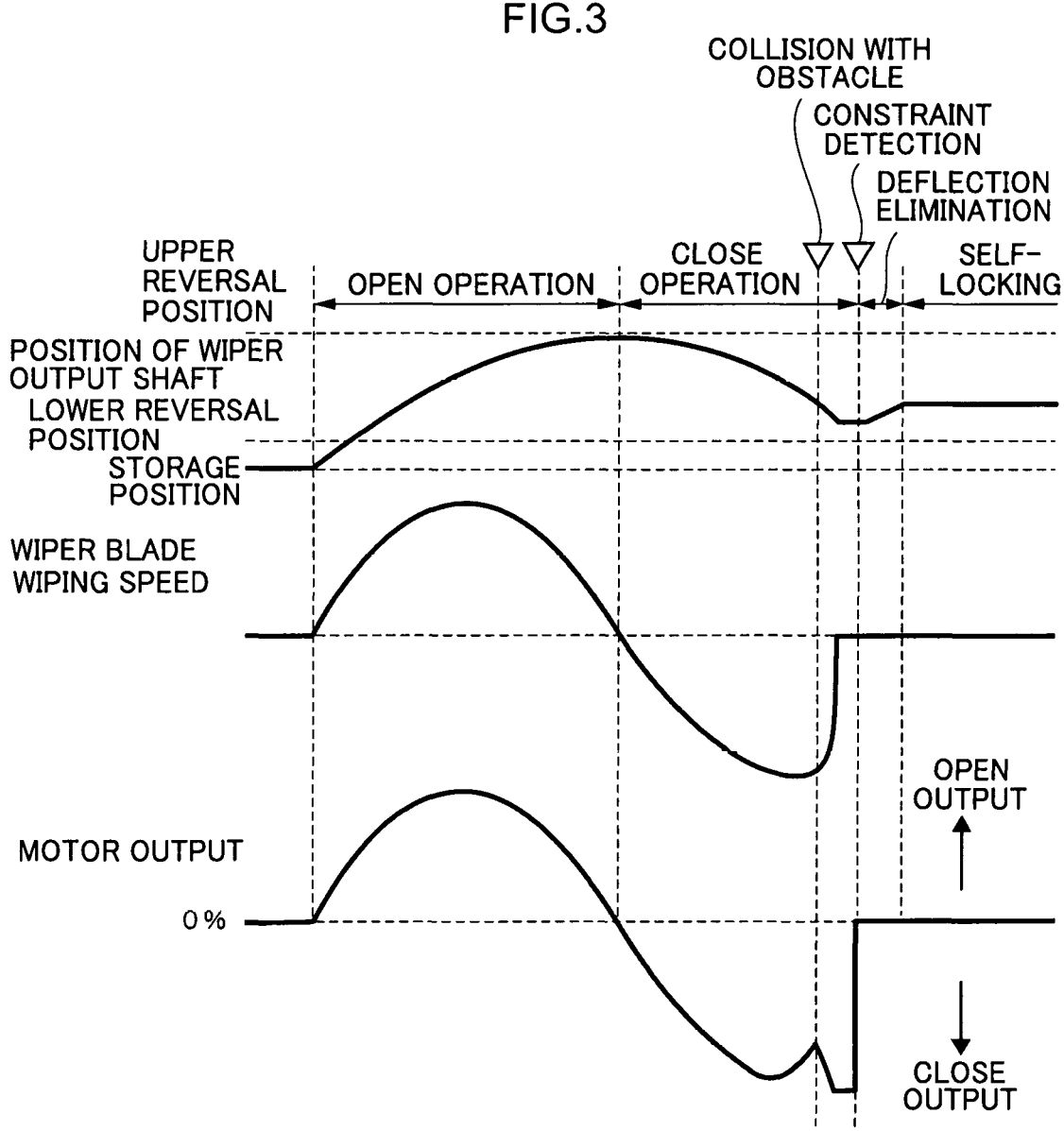

WIPER CONTROL DEVICE

TECHNICAL FIELD

The present invention relates to a wiper control device.

BACKGROUND ART

A wiper apparatus that operates a wiper blade on a driver's seat side and a wiper blade on a passenger's seat side with one wiper motor has a link mechanism for transmitting the rotational force of the wiper motor to a wiper arm. In a case in which external force due to a traveling wind or the like of a vehicle acts on a wiper blade or a wiper arm, the link mechanism also has a function of suppressing the wiper blade from moving to an unintended position by the external force.

However, in many cases, the wiper apparatus that operates the wiper blade on the driver's seat side and the wiper blade on the passenger's seat side with separate and independent motors does not have the link mechanism between the wiper arm and the wiper motor. In such a wiper apparatus, when the wiper blade receives the external force due to the traveling wind or the like of the vehicle, the probability that the wiper blade moves to an unintended position is higher than that of the wiper apparatus that has the link mechanism.

Japanese National-Phase Publication (JP-A) No. 2011-512285, Japanese Patent No. 4691165, and Japanese Patent No. 5535738, disclose a wiper apparatus that drives a wiper motor so as to cancel external force when a wiper blade stopped at a stop reference position such as a lower reversal position is moved by the action of the external force, and performs a self-clock to return the moved wiper blade to an original position such as the lower reversal position.

SUMMARY OF INVENTION

Technical Problem

However, in the techniques disclosed in JP-A No. 2011-512285, Japanese Patent No. 4691165, and Japanese Patent No. 5535738, when an obstacle such as a snow puddle exists on a windshield glass, a load may be applied to a wiper motor in a case in which a wiper blade cannot reach a predetermined position such as a lower reversal position or a storage position.

FIG. 7 shows an example of a wiper blade position, a wiper blade wiping speed, and a motor output in a wiper apparatus capable of self-locking. FIG. 7 shows that a wiper blade starts an OPEN operation of operating from a storage position toward an upper reversal position, and starts a CLOSE operation of operating from the upper reversal position toward the storage position after the wiper blade reaches the upper reversal position. The wiper blade wiping speed and the motor output become maximal in the middle of the OPEN operation and become 0 at the upper reversal position, and then, become maximal in the opposite direction to the case of the OPEN operation in the middle of the CLOSE operation.

In addition, FIG. 7 shows an example of a case in which the CLOSE operation is inhibited by a snow puddle or the like, and the wiper blade is stopped at a position before the storage position or the lower reversal position. The wiper blade wiping speed is rapidly decelerated by the influence of the snow puddle, and the motor output increases the output so as to maintain the wiping speed. In such a case, the wiper apparatus that performs self-locking performs the control of self-locking with the position of the wiper blade stopped before the lower reversal position as the stop reference position.

However, in a state in which the wiper blade is stopped at the stop reference position shown in FIG. 7, a stress causing deflection of the wiper arm is exerted on an output shaft of the wiper apparatus due to an obstacle such as a snow puddle. When the self-locking is performed in this state, the wiper motor continues to be driven against the stress that deflects the wiper arm. As a result, the wiper motor, the motor driving circuit, or the like is overheated, and the operation of the wiper motor may be urgently stopped due to the fail safe for preventing overheating.

Embodiments of the invention have been made in view of the above fact, and it is an object of the invention to provide a wiper control device that performs self-locking by eliminating the influence of deflection of a wiper arm due to an obstacle on a windshield glass.

Solution to Problem

In order to solve the above issue, the present disclosure includes: a rotational angle detection unit that detects a rotational angle of an output shaft of a wiper motor for reciprocal wiping with a wiper blade on a windshield glass; and a control unit that, in a case of having determined, based on the rotational angle detected by the rotational angle detection unit, that the wiper blade has stopped at a position other than a predetermined position, stops power supply for rotating the wiper motor for a predetermined time, and that, in a case in which a difference between a rotational angle detected by the rotational angle detection unit at a time at which the wiper blade has stopped, and a rotational angle detected by the rotational angle detection unit after the power supply to the wiper motor has been stopped for the predetermined time, becomes a predetermined value, performs energization control for performing self-locking.

According to the wiper control device, when the wiping operation of the wiper blade is stopped by an obstacle or the like on a windshield glass, the energization to the wiper motor is stopped to eliminate deflection of a wiper arm due to interference of the obstacle or the like. Self-locking is performed when the amount of change of the rotational angle of the output shaft of the wiper motor before and after energization stop reaches a predetermined value. As a result, it is possible to perform the self-locking by eliminating the influence of the deflection of the wiper arm due to the obstacle on the windshield glass.

In addition, in the disclosure, the control unit determines whether or not the wiper blade has stopped at the position other than the predetermined position based on a position of the wiper blade obtained from the rotational angle detected by the rotational angle detection unit and a rotational speed of the output shaft obtained from the rotational angle detected by the rotational angle detection unit.

According to the wiper control device, when the position of the wiper blade calculated from the rotational angle of the output shaft is the position other than the predetermined position and the rotational speed of the output shaft is reduced, it can be determined that the wiper blade has stopped before the predetermined position due to the obstacle or the like.

In addition, in the disclosure, in a case in which the power supply for rotating the wiper motor is stopped for a predetermined time, the control unit performs brake control of the output shaft by short-circuiting terminals of the wiper motor.

According to the wiper control device, the rotation of the output shaft of the wiper motor is braked by applying a voltage of the same polarity to each terminal of the wiper motor to which voltages of different polarities are applied during rotation. Such braking can prevent the phenomenon that the wiper blade is repelled by the deflection of the wiper arm.

In addition, in the disclosure, in order to maintain a stopped state of the wiper blade, in a case in which the rotational angle detected by the rotational angle detection unit changes, the self-locking rotates the output shaft such that the change is canceled out.

According to the wiper control device, when the rotational angle of the output shaft of the wiper motor detected by the rotational angle detection unit changes, the rotation of the output shaft due to the external force is suppressed by the control of rotating the output shaft such that the change is cancelled out. By performing such a control, the rotation of the output shaft due to the external force can be prevented without separately requiring a mechanism for mechanically constraining the output shaft.

BRIEF DESCRIPTION OF DRAWINGS

FIG. 3 shows an example of a wiper blade position, a wiper blade wiping speed, and a motor output in the wiper control device according to the present embodiment.

DESCRIPTION OF EMBODIMENTS

Figure 1:
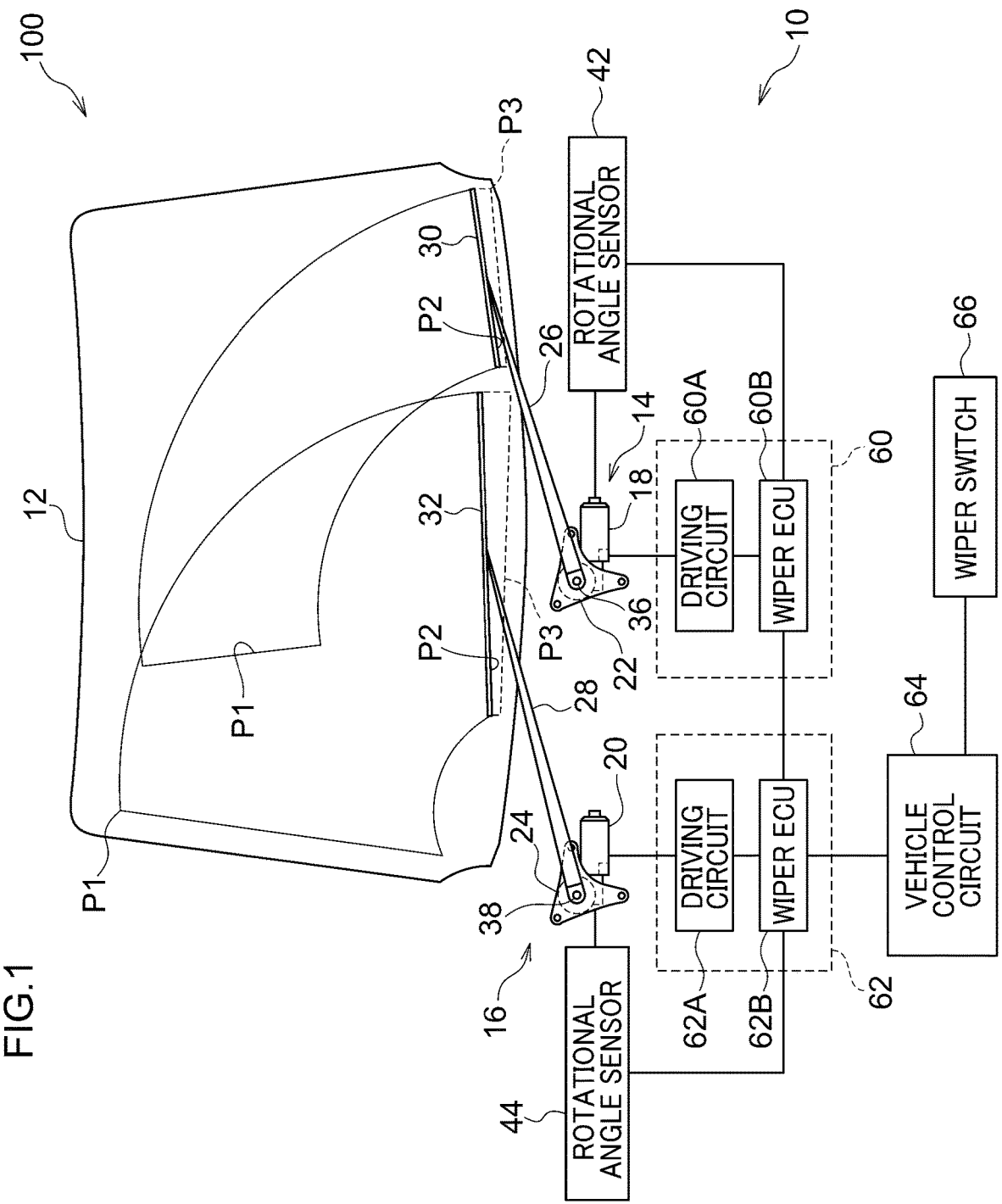
FIG. 1 is a schematic diagram showing a configuration of a wiper apparatus including a wiper control device according to the present embodiment.

FIG. 1 is a schematic diagram showing a configuration of a wiper apparatus 100 including a wiper control device 10 according to the present embodiment. As an example, the wiper apparatus 100 is a tandem wiper apparatus including a left wiper apparatus 14 on the left (passenger's seat side) of a lower part of a windshield glass 12 of a right-hand drive vehicle, and a right wiper apparatus 16 on the right (driver's seat side) of a lower part of the windshield glass 12 of the vehicle. The left and the right in the present embodiment are the left and the right as seen from the vehicle interior.

The left wiper apparatus 14 and the right wiper apparatus 16 include wiper motors 18 and 20, deceleration mechanisms 22 and 24, wiper arms 26 and 28, and wiper blades 30 and 32, respectively. The wiper motors 18 and 20 are provided on the lower left side and the lower right side of the windshield glass 12, respectively.

In the left wiper apparatus 14 and the right wiper apparatus 16, the forward and reverse rotations of the wiper motors 18 and 20 are respectively decelerated by the deceleration mechanisms 22 and 24, and output shafts 36 and 38 are respectively rotated in the forward and reverse directions decelerated by the deceleration mechanisms 22 and 24. Further, when the rotating forces of the forward and reverse rotation of the output shafts 36 and 38 act on the wiper arms 26 and 28, the wiper arms 26 and 28 move from a storage position P3 to a lower reversal position P2, and reciprocates between the lower reversal position P2 and an upper reversal position P1. Due to the operations of the wiper arms 26 and 28, the wiper blades 30 and 32 respectively provided at the tips of the wiper arms 26 and 28 wipe between the lower reversal position P2 and the upper reversal position P1 on the surface of the windshield glass 12. Note that the deceleration mechanisms 22 and 24 are provided with, for example, worm gears or the like, respectively decelerate the rotations of the wiper motors 18 and 20 to the rotational speeds suitable for wiping the surface of the windshield glass 12 by the wiper blades 30 and 32, and respectively rotate the output shafts 36 and 38 at the rotational speeds. Note that the upper reversal position P1, the lower reversal position P2, and the storage position P3 are predetermined positions on the windshield glass 12, and the lower reversal position P2 may also serve as the storage position P3, depending on the wiper apparatus.

As described above, since the wiper motors 18 and 20 according to the present embodiment include the deceleration mechanisms 22 and 24 provided with the worm gears, respectively, the rotational speeds and the rotational angles of the output shafts 36 and 38 are not the same as the rotational speeds and the rotational angles of the main bodies of the wiper motors 18 and 20. However, in the present embodiment, since the wiper motors 18 and 20 and the deceleration mechanisms 22 and 24 are respectively integrally formed inseparably, the rotational speeds and the rotational angles of the output shafts 36 and 38 are hereinafter regarded as the rotational speed and the rotational angle of each of the wiper motors 18 and 20.

Wiper control circuits 60 and 62 for controlling the rotations of the wiper motors 18 and 20 are respectively connected to the wiper motors 18 and 20. The wiper control circuit 60 according to the present embodiment includes a driving circuit 60A and a wiper ECU 60B, and the wiper control circuit 62 includes a driving circuit 62A and a wiper ECU 62B.

A rotational angle sensor 42 that detects the rotational speed and the rotational angle of the output shaft 36 of the wiper motor 18 is connected to the wiper ECU 60B. A rotational angle sensor 44 that detects the rotational speed and the rotational angle of the output shaft 38 of the wiper motor 20 is connected to the wiper ECU 62B. The wiper ECUs 60B and 62B calculate the positions of the wiper blades 30 and 32 on the windshield glass 12 based on signals from the rotational angle sensors 42 and 44, respectively. In addition, the wiper ECUs 60B and 62B control the driving circuits 60A and 62A, respectively, such that the rotational speeds of the output shafts 36 and 38 change according to the calculated positions of the wiper blades 30 and 32. Note that the rotational angle sensors 42 and 44 are respectively provided in the deceleration mechanisms 22 and 24 of the wiper motors 18 and 20, and convert the magnetic fields (magnetic forces) of excitation coils or magnets rotating in conjunction with the output shafts 36 and 38 into current and detect the same. In addition, when the self-locking is performed, whether or not the wiper blade deviates from a stop reference position is detected by the rotational angle sensors 42 and 44. The stop reference position varies depending on the specification of the wiper apparatus 100 and changes when external force acts on the wiper blades 30 and 32 as will be described later, but in the present embodiment, the stop reference position is usually the storage position P3.

The driving circuits 60A and 62A generate voltages (currents) for respectively operating the wiper motors 18 and 20 by pulse width modulation (PWM) control, and respectively supply the voltages (currents) to the wiper motors 18 and 20. The driving circuits 60A and 62A include a circuit using a metal oxide semiconductor field effect transistor (MOSFET) as a switching element. The driving circuit 60A outputs a voltage of a predetermined duty ratio under the control of the wiper ECU 60B, and the driving circuit 62A outputs a voltage of a predetermined duty ratio under the control of the wiper ECU 62B.

The wiper ECU 60B and the wiper ECU 62B synchronize the operations of the left wiper apparatus 14 and the right wiper apparatus 16 by cooperating by communication using a protocol such as, local interconnect network (LIN). In addition, a wiper switch 66 is connected to the wiper ECU 62B of the wiper control circuit 62 through a vehicle control circuit 64.

The wiper switch 66 is a switch for turning on or off power supplied from a battery of a vehicle to the wiper motors 18 and 20. The wiper switch 66 can switch the wiper blades 30 and 32 to a low speed operation mode selection position for operating at a low speed, a high speed operation mode selection position for operating at a high speed, an intermittent operation mode selection position for intermittently operating at a constant cycle, or a stop mode selection position. In addition, a command signal for rotating the wiper motors 18 and 20 according to the selection position of each mode is output to the wiper ECU 62B through the vehicle control circuit 64. In addition, the command signal input to the wiper ECU 62B is also input to the wiper ECU 60B by communication using the protocol such as the LIN.

When the signal output from the wiper switch 66 according to the selected position of each mode is input to the wiper ECUs 60B and 62B, the wiper ECUs 60B and 62B perform control corresponding to the output signal from the wiper switch 66. Specifically, the wiper ECUs 60B and 62B calculate the rotational speeds of the output shafts 36 and 38 based on the command signal from the wiper switch 66. Further, the wiper ECUs 60B and 62B control the driving circuits 60A and 62A such that the output shafts 36 and 38 rotate at the calculated rotational speed.

Figure 2:
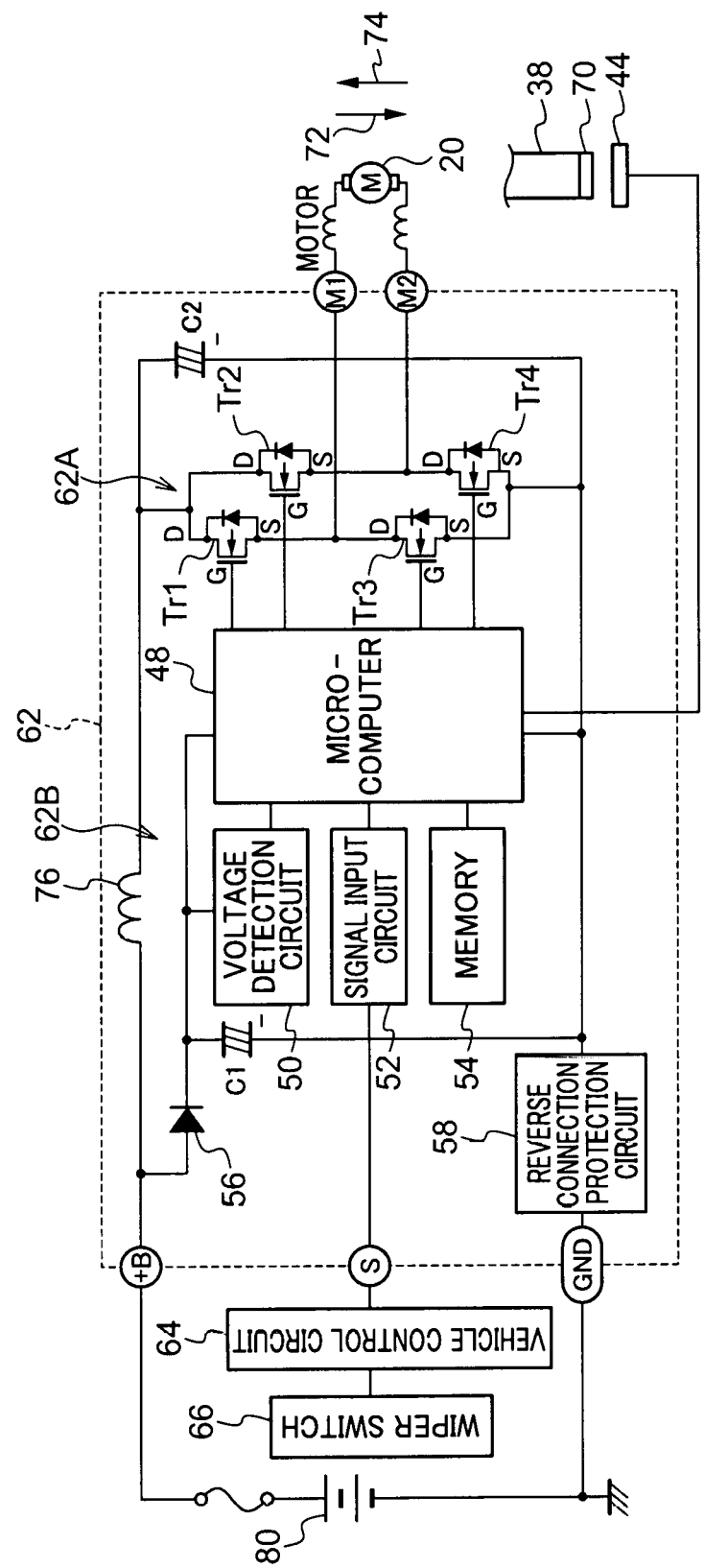
FIG. 2 is a block diagram showing an example of a schematic configuration of a wiper control circuit of a right wiper apparatus according to the present embodiment.

FIG. 2 is a block diagram showing an example of a schematic configuration of the wiper control circuit 62 of the right wiper apparatus 16 according to the present embodiment. In addition, as an example, the wiper motor 20 shown in FIG. 2 is a DC motor with a brush. Since the configuration of the wiper control circuit 60 of the left wiper apparatus 14 is the same as that of the wiper control circuit 62 of the right wiper apparatus 16, a detailed description thereof will be omitted.

The wiper control circuit 62 shown in FIG. 2 includes a driving circuit 62A that generates a voltage to be applied to a winding terminal of the wiper motor 20, and a microcomputer 48 of the wiper ECU 62B that controls on and off of a switching element constituting the driving circuit 62A. Power of a battery 80 is supplied to the microcomputer 48 through a diode 56. The voltage of the supplied power is detected by a voltage detection circuit 50 provided between the diode 56 and the microcomputer 48. The detection result is output to the microcomputer 48. In addition, an electrolytic capacitor C1 having one end connected between the diode 56 and the microcomputer 48 and the other end (−) grounded is provided. The electrolytic capacitor C1 is a capacitor for stabilizing the power supply of the microcomputer 48. The electrolytic capacitor C1 protects the microcomputer 48 by accumulating a sudden high voltage such as a surge and discharging the same to a ground region.

A command signal for instructing the rotational speed of the wiper motor 18 is input from the wiper switch 66 and the vehicle control circuit 64 to the microcomputer 48 through the signal input circuit 52. When the command signal output from the wiper switch 66 is an analog signal, the signal is digitized in the signal input circuit 52 and input to the microcomputer 48.

In addition, the rotational angle sensor 44 for detecting the magnetic field of the sensor magnet 70 that changes according to the rotation of the output shaft 38 is connected to the microcomputer 48. The microcomputer 48 determines the positions of the wiper blades 30 and 32 on the windshield glass 12 by calculating the rotational angle of the output shaft 38 based on the signal output by the rotational angle sensor 44.

Further, the microcomputer 48 controls the driving circuit 62A such that the rotation of the wiper motor 20 has the number of revolutions corresponding to the specified positions of the wiper blade 30 and 32, with reference to the data of the rotational speed of the wiper motor 20 defined according to the positions of the wiper blades 30 and 32 stored in the memory 54.

As shown in FIG. 2, the driving circuit 62A uses transistors Tr1, Tr2, Tr3, and Tr4, which are N-type field effect transistors (FETs), as switching elements. The drains of the transistors Tr1 and Tr2 are connected to the battery 80 through a noise prevention coil 76, and the sources thereof are connected to the drains of the transistor Tr3 and the transistor Tr4, respectively. In addition, sources of the transistors Tr3 and Tr4 are grounded.

The source of the transistor Tr1 and the drain of the transistor Tr3 are connected to one end of the winding of the wiper motor 18, and the source of the transistor Tr2 and the drain of the transistor Tr4 are connected to the other end of the winding of the wiper motor 18.

Since a high level signal is input to the gates of the transistors Tr1 and Tr4, the transistors Tr1 and Tr4 are turned on, and for example, a CW current 72 for operating the wiper blades 30 and 32 in a clockwise direction when seen from the vehicle interior side flows through the wiper motor 20. Further, when one of the transistor Tr1 and the transistor Tr4 is on-controlled, the other is subjected to on/off control in a small increment by PWM control, whereby the voltage of the CW current 72 can be modulated.

Since a high level signal is input to the gates of the transistors Tr2 and Tr3, the transistor Tr2 and the transistor Tr3 are turned on, and for example, a CCW current 74 for operating the wiper blades 30 and 32 in a counterclockwise direction when seen from the vehicle interior side flows through the wiper motor 20. Further, when one of the transistor Tr2 and the transistor Tr3 is on-controlled, the other is subjected to on/off control in a little at time by PWM control, whereby the voltage of the CCW current 74 can be modulated.

In the present embodiment, a reverse connection protection circuit 58 and a noise prevention coil 76 are provided between the battery 80, which is the power supply, and the driving circuit 62A, and an electrolytic capacitor C2 is provided in parallel with the driving circuit 62A. The noise prevention coil 76 is an element for suppressing noise generated by the switching of the driving circuit 62A.

The electrolytic capacitor C2 is an element for alleviating noise generated from the driving circuit 62A, storing a sudden high voltage such as a surge, and discharging the same to the ground region so as to prevent an excessive current from being input to the high voltage driving circuit 62A.

The reverse connection protection circuit 58 is a circuit for protecting elements constituting the wiper control circuit 62 when a positive electrode and a negative electrode of the battery 80 are connected in reverse to the case shown in FIG. 2. As an example, the reverse connection protection circuit 58 includes a so-called diode-connected FET or the like in which the drain thereof is connected to the gate thereof. In addition, although not shown in FIG. 2, in the present embodiment, a current sensor for detecting the current value of each of the wiper motors 18 and 20 is provided.

Hereinafter, the function and effect of the wiper control device 10 according to the present embodiment will be described. FIG. 3 shows an example of the wiper output shaft position, the wiper blade wiping speed, and the motor output in the wiper control device 10 according to the present embodiment. FIG. 3 shows that the wiper blades 30 and 32 start an OPEN operation of operating from the storage position P3 toward the upper reversal position P1, and start a CLOSE operation of operating from the upper reversal position P1 toward the storage position P3 after the wiper blades 30 and 32 reach the upper reversal position P1.

In addition, FIG. 3 shows an example of a case in which the CLOSE operation is inhibited by external force such as a snow puddle, and the wiper blades 30 and 32 are stopped at a position before the storage position or the lower reversal position. The wiper blade wiping speed is rapidly decelerated upon collision with a snow puddle as an obstacle, and the motor output increases the output so as to maintain the wiping speed. However, since the wiper blades 30 and 32 are in a state of "colliding with an obstacle", the wiper arms 26 and 28 are deflected. When the deflection of the wiper arms 26 and 28 becomes large, the resistance acting on the output shafts 36 and 38 also increases, and the time at which the rotations of the output shafts 36 and 38 are stopped by the resistance is referred to as "constraint detection" shown in FIG. 3.

In the present embodiment, in the case of the "constraint detection", "deflection elimination" shown in FIG. 3 is performed so as to eliminate the stress acting on the wiper arms 26 and 28 and then perform self-locking. In the "deflection elimination", the supply of power for rotating the wiper motors 18 and 20 is stopped.

Figure 4A:
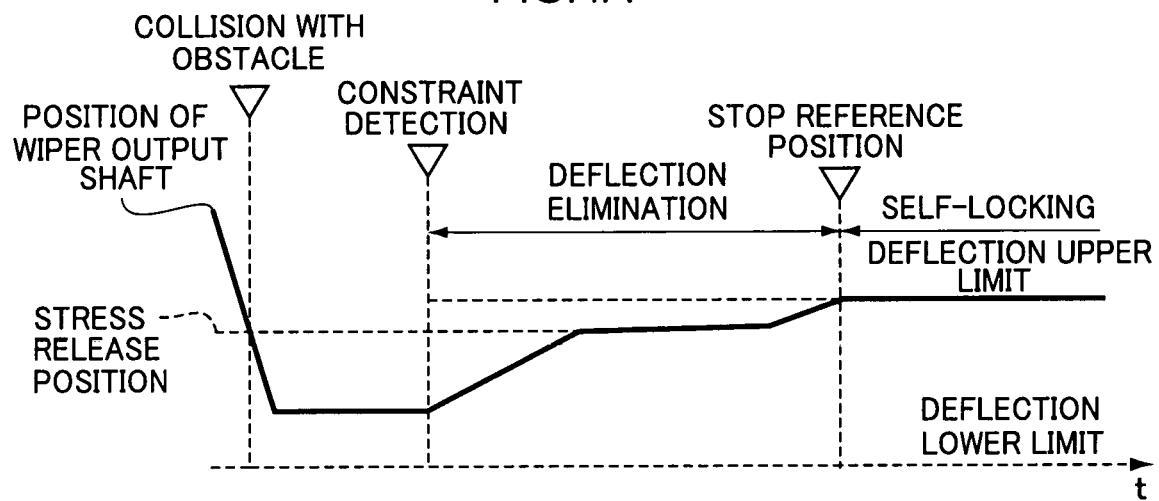
FIG. 4A is a schematic diagram showing an example of a case in which a self-locking is performed when a wiper arm moves from a storage position side toward an upper reversal position side after "deflection elimination" is performed in the wiper control device according to the present embodiment.
Figure 4B:
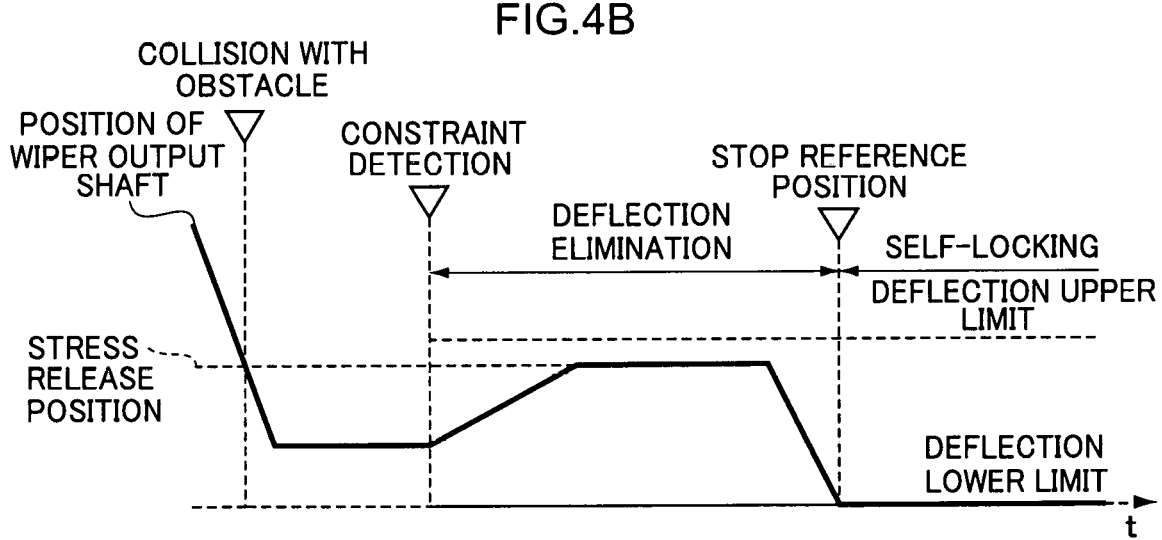
FIG. 4B is a schematic diagram showing an example of a case in which a self-locking is performed when a wiper arm moves from an upper reversal position side toward a storage position side after "deflection elimination" is performed in the wiper control device according to the present embodiment.

FIG. 4A is a schematic diagram showing an example of a case in which the self-locking is performed when the wiper arms 26 and 28 move from the storage position P3 side toward the upper reversal position P1 side after the "deflection elimination" is performed. FIG. 4B is a schematic diagram showing an example of a case in which the self-locking is performed when the wiper arms 26 and 28 move from the upper reversal position P1 side toward the storage position P3 side after the "deflection elimination" is performed.

Even if the movements of the wiper blades 30 and 32 and the wiper arms 26 and 28 are inhibited by a snow puddle or the like as an obstacle, the wiper arms 26 and 28 are bend, and thus the output shafts 36 and 38 of the wiper motors 18 and 20 continue to rotate for a while even after "collision with the obstacle". When the deflection of the wiper arms 26 and 28 reaches the limit, the output shafts 36 and 38 cannot rotate any longer, and the output shafts 36 and 38 stop rotating. In the present embodiment, the time at which the output shafts 36 and 38 stop rotating is referred to as "constraint detection". The microcomputer 48 determines the "constraint detection" in a case in which the wiper blades 30 and 32 are stopped at positions other than the storage position P3 or the lower reversal position P2, based on the positions of the wiper blades 30 and 32 obtained from the rotational angles of the output shafts 36 and 38 detected by the rotational angle sensors 42 and 44, and the rotational speeds of the output shafts 36 and 38 obtained from the rotational angles detected by the rotational angle sensors 42 and 44.

In addition to the "constraint detection", the microcomputer 48 sets a "deflection upper limit" and a "deflection lower limit" shown in FIG. 4. The "deflection upper limit" and the "deflection lower limit" shown in FIG. 4 are an upper limit and a lower limit of a predetermined range centered on a position when the wiper blades 30 and 32 are locked by an obstacle. The predetermined range is specifically determined according to the specification or the like of the wiper apparatus.

In addition, the microcomputer 48 performs control such that the stress acting on the wiper arms 26 and 28 and the like due to the obstacle is eliminated at the time of the "constraint detection". Specifically, the supply of power for rotating the wiper motors 18 and 20 is stopped for a predetermined time. Since the time to stop the supply of power is different according to the specification or the like of the wiper apparatus, a specific optimum value is set for each product. As a result, the output shafts 36 and 38 are rotated in a direction in which the deflection of the wiper arms 26 and 28 is relaxed. When the "position of the wiper output shaft" returns to the position at which the wiper blades 30 and 32 "collided with the obstacle", the stress acting on the wiper blades 30 and 32 and the wiper arms 26 and 28 is eliminated and the "deflection elimination" is completed.

However, since the power is not supplied to the wiper motors 18 and 20 after the "deflection elimination", there is a case in which the positions of the wiper blades 30 and 32 move from the position at which the "deflection elimination" is completed due to external force related to a traveling wind. FIG. 4A shows a case in which a "stress release position" at which the "deflection elimination" is completed is a position at which the wiper blades 30 and 32 and the like are pushed up by the traveling wind. FIG. 4B shows a case in which a "stress release position" at which the "deflection elimination" is completed is a position at which the wiper blades 30 and 32 and the like are pushed down by the traveling wind.

In the present embodiment, when the "position of the wiper output shaft" reaches the "deflection upper limit" or the "deflection lower limit", self-locking control is started. In the self-locking, the power is supplied to the wiper motors 18 and 20 such that the output shafts 36 and 38 are rotated on the side opposite to the shifted direction, according to the amount by which the "position of the wiper output shaft" deviates from the "deflection upper limit" or the "deflection lower limit" that is the "stop reference position".

Figure 5:
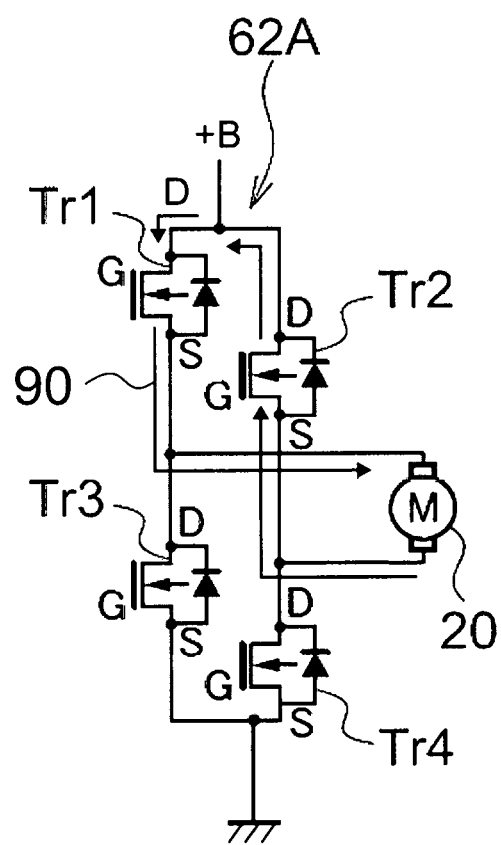
FIG. 5 is a schematic diagram showing an example of brake energization by the wiper control device according to the present embodiment.

In addition, the microcomputer 48 may perform brake energization as shown in FIG. 5 so as to eliminate the deflection at the time of the "constraint detection" of the wiper arms 26 and 28 as the control to eliminate the stress acting on the wiper arms 26 and 28 due to the obstacle. In FIG. 5, the driving circuit 62A and the wiper motor 20 of the right wiper apparatus 16 are described as an example. Since the configuration of the driving circuit 60A of the left wiper apparatus 14 is the same as that of the driving circuit 62A of the right wiper apparatus 16, a detailed description thereof will be omitted.

As shown in the example of FIG. 5, in the brake energization, the transistor Tr1 and the transistor Tr2 are respectively turned on to short-circuit the terminals of the motor, and current 90 generated in the coil of the motor is supplied in the direction indicated by the arrow. A positive charge voltage is applied to one terminal and the other terminal of the wiper motor 20 such that the one terminal and the other terminal are short-circuited, whereby the rotation of the output shaft 38 of the wiper motor 20 is suppressed. Note that in the brake energization, the transistor Tr3 and the transistor Tr4 may be respectively turned on such that one terminal and the other terminal of the wiper motor 20 are grounded. Since the time to perform the brake energization is different according to the specification or the like of the wiper apparatus, a specific optimum value is set for each product.

The stress due to the deflection can be eliminated by releasing the energization to the wiper motor 20 without performing the brake energization, but the wiper arm 28 is repelled by the stress caused by the deflection and the wiper blade 32 may move to an unintended position. In such a case, in the present embodiment, it is possible to set the position of the wiper blade 32 after the "deflection elimination" to be close to the position stopped by the obstacle by suppressing the rotation of the output shaft 38 of the wiper motor 20 by the brake energization as shown in FIG. 5.

Figure 6:
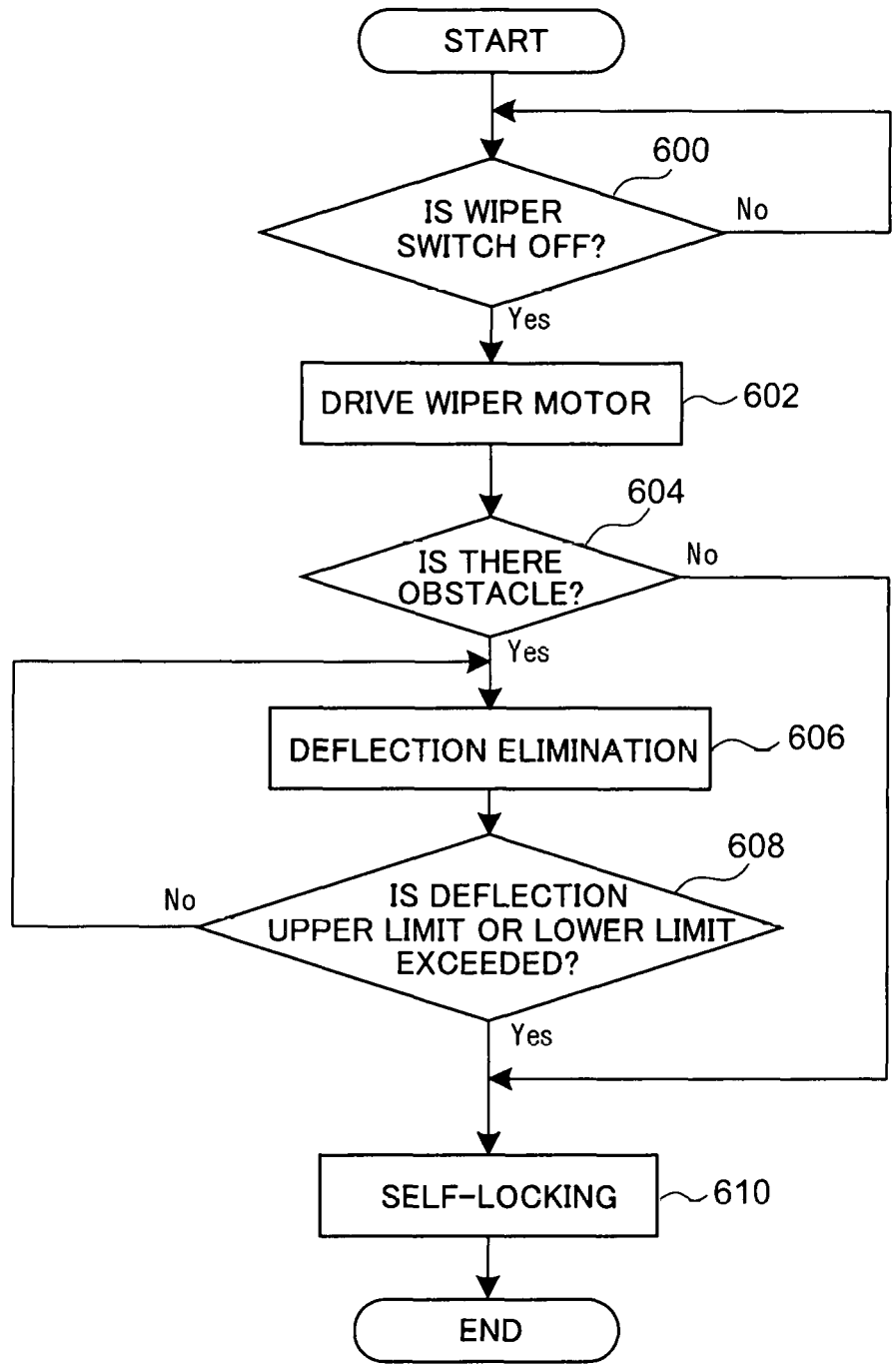
FIG. 6 is a flowchart showing an example of a deflection elimination process in the wiper control device according to the present embodiment.
Figure 7:
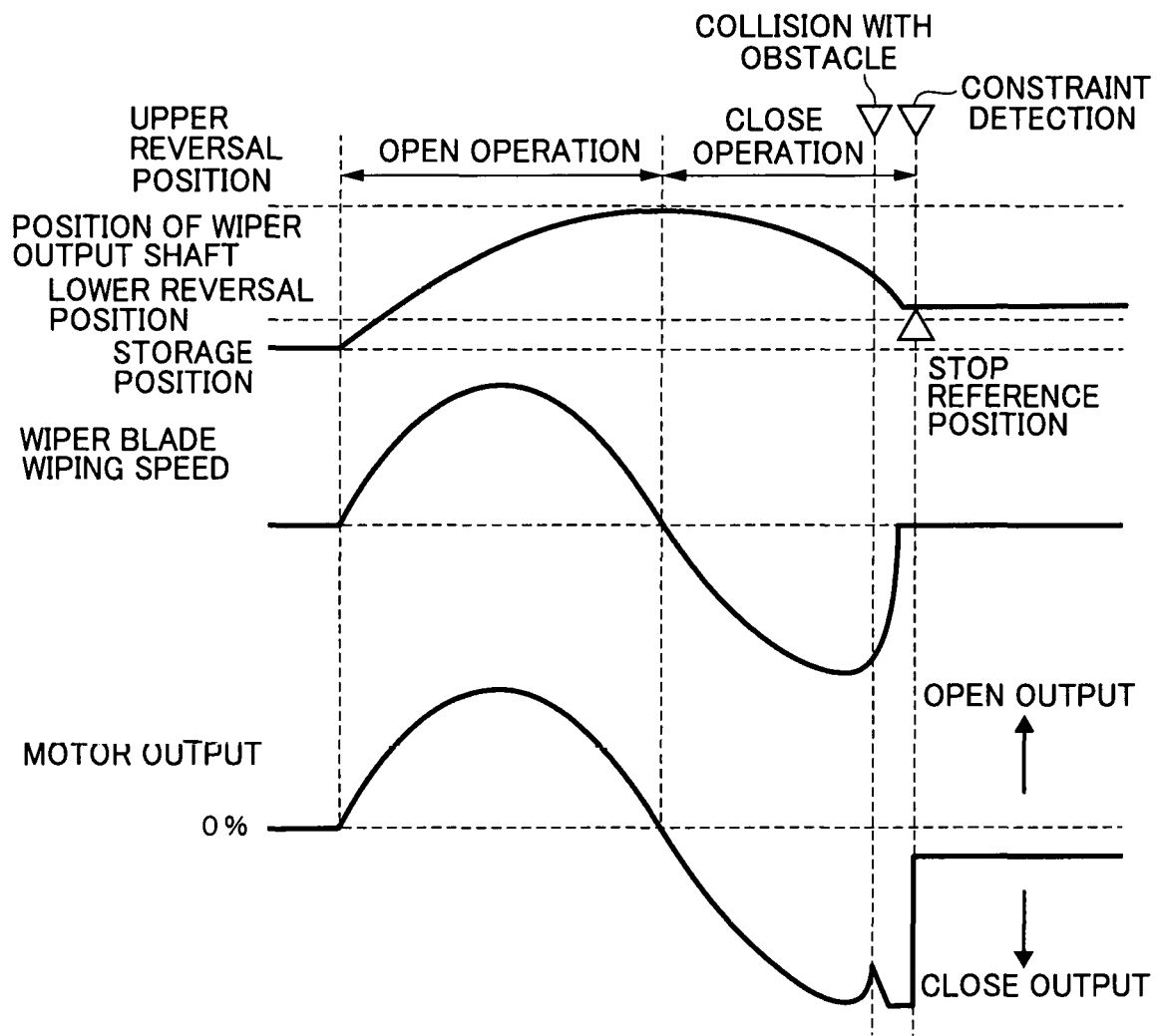
FIG. 7 shows an example of a wiper blade position, a wiper blade wiping speed, and a motor output in a wiper apparatus capable of self-locking.

FIG. 6 is a flowchart showing an example of a deflection elimination process in the wiper control device 10 according to the present embodiment. In step 600, it is determined whether or not the wiper switch 66 is turned off. In the case of an affirmative determination, in step 602, the wiper motors 18 and 20 are driven so as to move the wiper blades 30 and 32 to a self-locking target position, which is a position at which the self-locking is performed. A self-locking target position is, for example, the storage position P3 or the lower reversal position P2.

In step 604, it is determined whether or not the wiping operation of the wiper blades 30 and 32 is obstructed by the obstacle on the windshield glass 12, based on the rotational angles and the rotational speeds of the wiper motors 18 and 20 or the change in the current values of the wiper motors 18 and 20. If the case of an affirmative determination, the procedure proceeds to step 606, and in the case of a negative determination, the procedure proceeds to step 610.

In step 606, the supply of power to the wiper motors 18 and 20 is stopped, or the brake energization as shown in FIG. 5 is performed to eliminate the deflection of the wiper arms 26 and 28 or the like. In step 608, it is determined whether or not the positions of the wiper blades 30 and 32 after the "deflection elimination" exceed the "deflection upper limit" or the "deflection lower limit". In the case of an affirmative determination in step 608, the positions of the wiper blades 30 and 32 after the "deflection elimination" are set as the "stop reference position", the self-locking is performed in step 610, and the process is ended. In the case of a negative determination in step 608, the procedure returns to step 606 to continue the "deflection elimination".

As described above, in the present embodiment, when the operations of the wiper blades 30 and 32 are obstructed by the obstacle on the windshield glass 12, the deflection elimination control is performed on the wiper motors 18 and 20 to remove the influence of the deflection of the wiper arms 26 and 28 due to the obstacle, such that the self-locking can be performed. As a result, it is possible to maintain the stopped state of the wiper arms 26 and 28 in the vicinity of the position at which the wiper arms 26 and 28 are stopped by the obstacle.

Further, in the present embodiment, when the amount of movement of the wiper blades 30 and 32 before and after the "deflection elimination" is within a predetermined range, the deflection elimination control to the wiper motors 18 and 20 is continued.

Further, in the present embodiment, when the amount of movement of the wiper blades 30 and 32 before and after the "deflection elimination" exceeds a predetermined range, the position of the wiper blade after the "deflection elimination" is set as the "stop reference position" and the self-locking is performed at the "stop reference position". In a case in which the influence of the stress due to the obstacle or the like is large, since the wiper motors 18 and 20 are not forcibly driven, it is possible to prevent an excessive load from being applied to the wiper motors 18 and 20.

Note that the wiper control device 10 according to the present embodiment may also be used for a wiper apparatus having a link mechanism other than the tandem type wiper apparatus 100 having no link mechanism.

In addition, the invention is not limited to the above, and it is needless to say that various modifications can be made within the range not departing from the gist other than the above.

The disclosure of Japanese Patent Application No. 2016-029152, filed on Feb. 18, 2016, is incorporated herein by reference in its entirety.

The invention claimed is:

1. A wiper control device, comprising:
a rotational angle detection unit that detects a rotational angle of an output shaft of a wiper motor for reciprocal wiping with a wiper blade on a windshield glass; and
a control unit that, in a case of having determined, based on the rotational angle detected by the rotational angle detection unit, that the wiper blade has stopped at a position other than a predetermined position, stops power supply for rotating the wiper motor for a predetermined time, and that, in a case in which a difference between a rotational angle detected by the rotational angle detection unit at a time at which the wiper blade has stopped, and a rotational angle detected by the rotational angle detection unit after the power supply to the wiper motor has been stopped for the predetermined time, becomes a predetermined value, performs energization control for performing self-locking.

2. The wiper control device according to claim 1, wherein the control unit determines whether or not the wiper blade has stopped at the position other than the predetermined position based on a position of the wiper blade obtained from the rotational angle detected by the rotational angle detection unit and a rotational speed of the output shaft obtained from the rotational angle detected by the rotational angle detection unit.

3. The wiper control device according to claim 1, wherein, in a case in which the power supply for rotating the wiper motor is stopped for a predetermined time, the control unit performs brake control of the output shaft by short-circuiting terminals of the wiper motor.

4. The wiper control device according to claim 1, wherein, in order to maintain a stopped state of the wiper blade, in a case in which the rotational angle detected by the rotational angle detection unit changes, the control unit performs the self-locking to rotate the output shaft such that the change is canceled out.

5. A wiper control device, comprising:
   a wiper motor configured to drive a wiper blade reciprocally on a windshield;
   a rotational angle detection sensor configured to detect a rotational angle of an output shaft of the wiper motor; and
   a control circuit configured to:
      determine, based on the rotational angle detected by the rotational angle detection sensor, that the wiper blade has stopped at a position other than a predetermined position, and in response thereto stop a power supply for rotating the wiper motor for a predetermined time; and
      determine that a difference between a rotational angle detected by the rotational angle detection sensor at a time at which the wiper blade has stopped, and a rotational angle detected by the rotational angle detection sensor after the power supply to the wiper motor has been stopped for the predetermined time, becomes a predetermined value, and in response thereto perform energization control of the wiper motor for self-locking.

* * * * *